May 23, 1933.    F. D. CHAPMAN    1,910,749
PROCESS FOR PEELING FRUIT
Filed Jan. 20, 1932    2 Sheets-Sheet 1
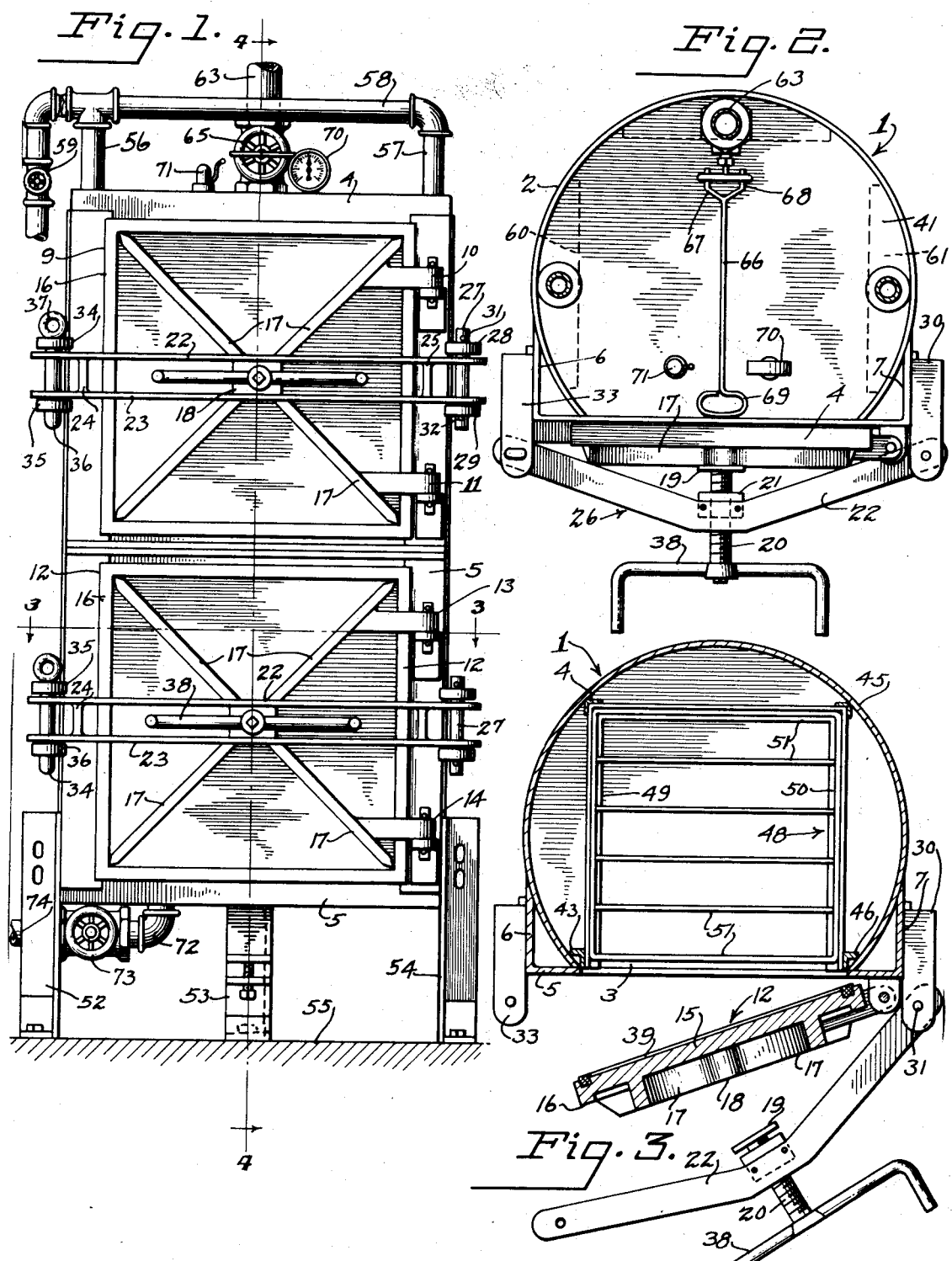

May 23, 1933.  F. D. CHAPMAN  1,910,749
PROCESS FOR PEELING FRUIT
Filed Jan. 20, 1932   2 Sheets-Sheet 2
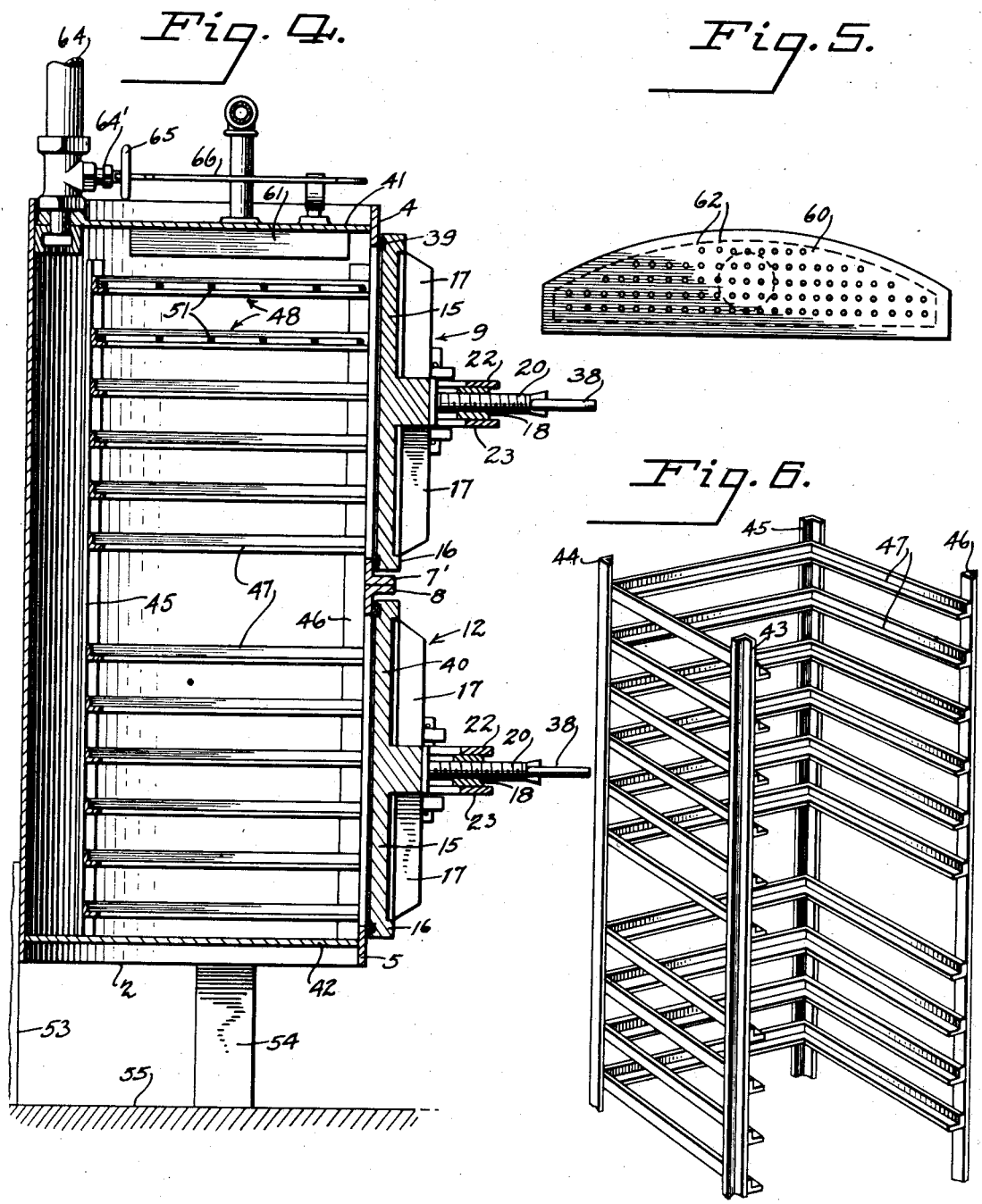
Inventor
Frank D. Chapman Patented May 23, 1933

1,910,749

UNITED STATES PATENT OFFICE

FRANK D. CHAPMAN, OF BERLIN, WISCONSIN

PROCESS FOR PEELING FRUIT

Application filed January 20, 1932. Serial No. 587,825.

This invention relates to a process and apparatus for removing the skins from tomatoes and other fruit and vegetables, such as peaches, apples and the like.

In the processes of removing skins from tomatoes as heretofore commonly practiced, the tomato is subjected to sufficient heat to blister the skin, which is then removed from the body or meat of the fruit by abrasion, either by mechanical action, or by fluid sprays directly applied to the blistered skin. In other prior processes, the tomato is subjected to heat of temperature extending in some instances to over 300° F. and this temperature is accompanied by a pressure of over 70 pounds. Where the pressure is great, there is danger of crushing relatively soft bodies of fruit of the tomato type, and the high temperature commonly causes cooking of the body, resulting in very undesirable color changes in the body of the skinned tomato or fruit.

The main object of the present invention is to subject the tomato or fruit to just sufficient heat to scald the skin and for such a short period of time as to obviate the possibility of cooking the body of the tomato or fruit, and then subjecting the tomato to vacuum whereby the scalded skin is exploded or forced from the body. To effect this object, the heat is applied in the form of steam at atmospheric pressure and for a short period of time not exceeding a minute.

Another object of the invention is to provide apparatus for conveniently carrying out the process referred to, and which can be cheaply manufactured and readily operated.

The process will be more fully described in connection with one form of the apparatus for carrying it out; and other objects of the invention will become apparent as the detailed description of the apparatus and involved process proceeds.

In the drawings:

Figure 1 is a front elevation of an apparatus designed for carrying out the process above referred to;

Figure 2 is a top plan view of the apparatus shown in Figure 1;

Figure 3 is a horizontal section taken on the line 3—3 of Figure 1;

Figure 4 is a vertical transverse section taken on the line 4—4 of Figure 1;

Figure 5 is a bottom plan view of one of three spraying manifolds forming a part of this apparatus; and Figure 6 is a perspective view of skeleton frame work forming a part of the apparatus designed to receive trays of fruit or vegetables to be skinned.

As shown in the drawings, the apparatus comprises a chamber 1 preferably made of a sheet of material 2 bent to form a segment of a cylinder. The chord of this segment forms the opening 3 of the cylinder. A pair of rectangular superposed door frames 4 and 5 are suitably welded or otherwise secured around the edge of the opening 3 between the front edges of the chamber 1; and each of these frames has flanges 6 and 7 extending perpendicularly therefrom and terminating against the curved surface of the chamber 1 to be suitably welded or otherwise secured thereto. The adjacent edges of the frames 4 and 5 are provided with flanges 7 and 8, respectively, which may be riveted or otherwise secured to each other with fluid tight fit.

The frame 4 has a door 9 secured thereto by hinges 10 and 11; and the frame 5 has a door 12 secured thereto by hinges 13 and 14. The door 12 comprises a plate or casting 15 of suitable material provided around its edges with reinforcing flanges 16. The plate 15 is also braced by ribs 17 extending diagonally between opposite corners of the flanges 16. These ribs 17 terminate in a center piece 18 adapted to receive the pressure of a plate 19 pivoted to the end of a screw 20. The screw 20 is threaded into a nut 21 suitably secured between the two flat horizontal plates 22 and 23 held in spaced apart relationship not only by the center piece 18, but also by spacing studs 24 and 25 welded or otherwise secured between said plates 22 and 23 and near the opposite ends thereof.

The pair of spacing studs 24 and 25, as thus secured to and spaced apart from each other, form a locking bar designated generally by the reference numeral 26. One end of the bar 26 is bored to receive a pivot bolt 27 passed through corresponding apertures in the furcations 28 and 29 of a bifurcated lug 30, the pivot bolt being secured in position on said furcations 28 and 29 by means of pins 31 and 32. A bifurcated lug 33, similar to the lug 30, has furcations 34 and 35 projecting forwardly of the frame 4, and these furcations are suitably bored to receive a locking pin 36 adapted to slide through corresponding apertures formed in the striking end of the locking bar 26. An eyelet 37 is formed on the upper end of the pin 36 to facilitate removal and insertion of the same from and to locking position.

The outer end of the screw 20 is provided with a locking handle 38, adapted when locking bar 26 is in locking position shown in Figures 1 and 2 of the drawings, to force the plate 19 against the reinforced center 18 of the door 9, and thereby press it securely into fluid tight contact with the face of the frame 4, a strip 39 of flexible material being bedded in a groove around the inner face of the door 9 and near the edge thereof to contact with the face of the frame 4 with fluid tight fit. The door 12 is, similar in every respect to the door 9, and is similarly mounted on the frame 5 and is provided with similar locking mechanism.

The upper end of the chamber 1 is closed by a plate 41 and the lower end is closed by a plate 42. Suitably supported on the bottom plate 42 is a skeleton tray frame comprising standards 43, 44, 45 and 46; and U-shaped angle iron slides 47 are suitably secured parallel to each other on the standards 43, 44, 45 and 46.

The frame formed by the standards and slides referred to, is mounted in the chamber 1 so that the corners of standards 44 and 35 contact with the inner periphery of the sheet 2; and the edges of each standard 43 and 46 contact with the arcuate periphery of the sheet 2. The standards 43 and 46 have their sides extending closely adjacent to the vertical edges of the opening 3 to form a reinforcement for the frame 4 to receive the impact or pressure of the door 9. Each of the slides 47 is adapted to receive a tray 48, shaped as a grid having side members 49 and 50 and cross members 51. The cross rods or members 51 are spaced apart to support the tomatoes or other fruit in such position as to expose them freely to scalding effect of the steam admitted under atmospheric pressure into the chamber 2.

The chamber 2 is supported bodily on standards 52, 53, and 54 suitably secured to a supporting floor or base 55. The top plate 41 is apertured at diametrically opposite sides to receive pipes 56 and 57 connected at their upper ends to a steam pipe 58 controlled by a valve 59. The pipes 56 and 57 extend through the top plate 41 and are connected to the manifolds 60 and 61, respectively. These manifolds are segmentally shaped, as shown in Figure 5, to fit closely against the arcuate sides of the chamber 1 and against the lower face of the top 41. The manifold 60 is provided at its lower face with a plurality of small apertures 62 through which the steam passes into the chamber 2 for the purpose of scalding the skins of the fruit supported on the trays 48. It will be noted that these manifolds are of such dimensions that the plane sides opposite the arcuate sides do not project over the frame work supporting the trays 48.

Directly opposite the door 12, the top 41 is provided with a pipe 63 connected to a source of cooling fluid which may be water at ordinary city pressure. The pipe 63 is controlled by a valve 64 provided with a handle 65. For convenience of operation, a rod 66 having furcations 67 and 68 formed on one end thereof may be used to control the rotation of the valve from the front of the apparatus; and the rod 66 is provided at its other end with a handle 69.

A pressure gauge 70 is secured to the top plate 41 in convenient position for observation from the front of the machine; and is, of course, connected to the inside of the chamber 2 to indicate the degree of pressure or vacuum therein. A relief valve 71 may also be secured to the top plate 41 to open the top of the chamber 2 to the atmosphere as soon as any pressure above atmospheric pressure appears in the chamber. The bottom plate 42 is apertured to receive an exhaust fitting 72 controlled by a valve 73 for the purpose of discharging the fluid contents of the chamber 2.

In the practice of this process, the steam pipe 58 is connected to a boiler in which steam is formed at atmospheric pressure and in which the only pressure forcing the scalding steam into the chamber 2 is the vapor pressure of the steam as released from water at its boiling point. At the start of a skinning operation, the doors 9 and 12 are opened to the atmosphere; the trays 48 filled with tomatoes or other fruit positioned on their slides in the skeleton framework within the chamber 2; the doors are then closed and the valves 59 and 73 are opened. Incidentally, the valve 73 and the pipe fitting connected thereto should be rather large to permit a very rapid flow of fluid material therethrough.

Upon the opening of the valves 59 and 73 the pressure of the steam vapor causes the steam to flow through the aperture 62 of the manifolds 60 and 61 and this vapor or steam, pressing on the air in the chamber 2 forces it out through the valve 73. As soon as the steam makes its appearance through the exhaust pipe 74, the valve 59 is closed; but the valve 73 is held open until the slight vapor pressure of the steam is released and the vacuum gauge 70 indicates atmospheric pressure within the steam filled chamber 2. Steam vapor is held for about 45 seconds to scald the tomatoes. At the end of this period, the valve 73 is closed and the valve 64 is opened to admit the spray of cooling fluid to the manifold 75 at the back of the chamber. The cooling spray causes an immediate reduction in temperature in the chamber 1 with a corresponding reduction in volume of the steam in said chamber. This decrease in volume creates a vacuum, the degree of which is indicated by movement of the indicator of the pressure gauge 70. Just as soon as the indicator starts back from its lowest vacuum indication, the valve 64 is closed to cut off the cooling fluid and the valve 73 is opened to discharge the condensed steam and cooling fluid from the bottom of the chamber. The doors 9 and 12 are then opened to remove the trays of scalded tomatoes or other fruit which will be found to have their skins exploded from the body of the tomato or fruit by the atmospheric pressure within the tomato.

It will be evident that because of the low scalding temperature and the short period of time to which the fruit is subjected to this temperature, the meat or body of the fruit can not cook. The application of the cooling medium and the decrease of volume within the chamber is so sudden and the vacuum created so great that the skins of the fruit are completely separated from the body or so lightly adhere thereto that they may be shaken off as the fruit is lifted from the tray.

In practice, it will not be necessary for the operator to observe the emission of steam from the exhaust pipe 74 to determine the time for turning on the cooling spray through the valve 64. After a few experimental runs of the apparatus, the time for each step may be determined empirically and the series of steps can be carried out in properly timed relation to each other.

As previously stated, the apparatus disclosed in this application for carrying out the process is purely illustrative of the form of which I have found practical for this purpose. The invention, however, is not to be limited or restricted in any respect to the particular structure or arrangement of apparatus applied for carrying it into practical operation.

What I claim is:

1. The process of removing the skin from tomatoes or similar fruit which consists in subjecting the fruit to steam at substantially atmospheric pressure within a closed space and then cooling the steam to create a vacuum in said space.

2. The process of removing the skin from tomatoes or similar fruit which consists in subjecting the fruit to steam at atmospheric pressure in a closed space and then spraying the confined steam with a cooling medium to produce a vacuum in said space.

3. The process of removing the skin from tomatoes or similar fruit which consists in subjecting the fruit to steam at substantially atmospheric pressure in a closed space and then condensing the confined steam to create a vacuum in said space.

In testimony whereof I affix my signature.

FRANK D. CHAPMAN.